United States Patent [19]

Werge-Olsen et al.

[11] Patent Number: 5,759,027
[45] Date of Patent: Jun. 2, 1998

[54] DEVICE FOR A RING SECTION FURNACE

[75] Inventors: Arne Werge-Olsen; Magne Asperheim; Audun Bosdal, all of Årdalstangen, Norway

[73] Assignee: Norsk Hydro a.s., Oslo, Norway

[21] Appl. No.: 600,172

[22] Filed: Feb. 12, 1996

[30] Foreign Application Priority Data

Feb. 10, 1995 [NO] Norway ................................. 950508

[51] Int. Cl.$^6$ .................................................. F27B 7/00
[52] U.S. Cl. .......................... 432/192; 432/128; 432/152; 432/193
[58] Field of Search ................................. 432/192, 193, 432/128, 143, 144, 148, 152, 155, 176, 199

[56] References Cited

U.S. PATENT DOCUMENTS

| | | | |
|---|---|---|---|
| 2,928,158 | 3/1960 | Miller | 432/128 |
| 4,253,823 | 3/1981 | Holdner | 432/192 |
| 4,269,592 | 5/1981 | Benton et al. | 432/192 |
| 4,284,404 | 8/1981 | Genevois et al. | 432/192 |
| 4,382,778 | 5/1983 | Peacey et al. | 432/192 |
| 4,552,530 | 11/1985 | Gunnes et al. | 432/192 |
| 4,859,175 | 8/1989 | Dreyer et al. | 432/192 |
| 4,944,672 | 7/1990 | Linga et al. | 432/192 |

*Primary Examiner*—Henry A. Bennett
*Assistant Examiner*—Jiping Lu
*Attorney, Agent, or Firm*—Wenderoth, Lind & Ponack

[57] ABSTRACT

A ring section furnace for the calcination of carbon bodies, has a number of chambers (K1–Kn) in which the carbon bodies are placed when performing the calcination process. During the calcination process, a part of the furnace comprising a minor number of chambers is divided into a preheating zone (K3-K2), a combustion zone (K7-K14), and a cooling zone (K8-K10) that together in a successive manner, are advanced relative to the furnace. Flue gases formed under the process are sucked out from the first chamber (K2) in the preheating zone through a pipe connection to a common ring duct (10). To eliminate the entrance of false air from the first chamber (K1) adjacent the preheating zone, a counterpressure fan (17) is arranged in connection with the first chamber (K1).

9 Claims, 3 Drawing Sheets

DEVICE FOR A RING SECTION FURNACE

BACKGROUND OF THE INVENTION

The present invention relates to a ring section furnace device for the calcination of carbon bodies, which consists of a number of chambers in which the carbon bodies are placed when performing the calcination process. During the calcination process, a part of the furnace comprising a minor number of chambers is divided into a preheating zone, a combustion zone, and a cooling zone that together, in a successive manner are advanced relative to the furnace. Flue gases formed in the combustion zone under the process are sucked out from the first chamber in the preheating zone through a pipe connection to a common ring duct.

The purpose of the calcination process is to carbonize the binding agent in the carbon blocks, to obtain homogenized carbon blocks with properties that make them suitable for use e. g. in aluminium electrolysis cells. The carbon blocks are produced in the required shape from a mixture of crushed coke or anthracite and a binding agent such as, for example, pitch.

Carbon blocks of this type may be of a considerable weight of several tons and of lengths of 1.5 meters or more, dependent on their use as anode or cathode elements in the electrolysis cells.

The carbon blocks are placed in the furnace in deep shafts, known as cassettes, that are built of fireproof bricks. The gap between the carbon blocks and the cassette walls is filled with coke that serves as a packing material for the support of the carbon blocks. The coke also serves to protect the carbon blocks from burning.

A number of cassettes are connected to each other and constitute, in this manner, a chamber. The walls between the cassettes are fitted with flue gas channels, and heat is transferred to the carbon blocks by the gases being passed through these channels.

The space above each chamber is covered with a lid. The flue gases from one chamber are led through channels to an adjacent chamber. In this manner the flue gases can be led through number of serially connected chambers in a preheating, combustion and cooling zones. The most frequently used fuels are oil and gas.

Flue gas discharge and burner equipment are successively moved from one chamber to the next.

A ring section furnace is fitted with two rows with the chambers connected to each other as parallel rows. At the end of a chamber row the gas flows are connected with channels to the parallel chamber row. In this way the chambers form a ring. For this reason this type of furnace is known as a ring section furnace.

Due to the special properties of the carbon bodies, it is necessary to avoid excessive temperature gradients during calcination that will result in cracks in the finished product. Each chamber must consequently be operated in accordance with an exact time and temperature program defined for the ring furnace.

The first phase of heat supply to a chamber takes place in the preheating zone, where the carbon blocks are heated up to 600° C. by using the gas heat from the last part of the combustion zone. At a later stage in the temperature interval from 600° C. to the required maximum temperature 1200°–1300° C., it becomes necessary to add heat through the above mentioned combustion of gas or oil.

The combustion zone is moved by moving the oil or gas burners from one chamber to the next. The frequency of this relocation is known as heating progress, and determines the capacity of the ring section furnace.

As mentioned, each chamber must have provisions to be connected to an exhaust system, partly for the removal of exhaust gases from the combustion zone, and partly for the supply of oxygen to the combustion zone, to obtain a complete combustion of gas or oil. This connection is generally established by fitting an exhaust pipe, possibly with a fan, between a chamber in the preheating zone and a ring duct. Ambient air is sucked through the combustion zone and serves to support this with a sufficient amount of oxygen. The gas is further sucked through the preheating zone before it is transported through the pipe and the exhaust fan to the ring duct and a purifying plant.

There are horizontal flue gas channels in the space below the chamber, whereas there is free gas flow in the space below the chamber lid above the cassettes. The flue gas channels in the cassette walls connect the space below the chamber lid and the spaces below the chamber In closed ring section furnaces the fuel may be supplied either in separate vertical furnace shafts, or preferably the fuel may be added fully or in part to the space above and/or below the cassettes as shown in the applicant's own Norwegian patents, no. 152,029 and no. 174,364.

In ring section furnaces the channels in each cassette wall are divided into two by a dividing wall in the room below the cassettes. The flue gases are consequently led up through one half of the wall and down through the other half of the wall.

A ring section furnace is controlled on the basis of the temperature of the gas that flows through the chambers. The temperature of the carbon blocks is lower than the gas temperature, and is a result of the heat transfer conditions in the furnaces. The heat transfer conditions depend mainly on the following parameters: chamber and cassette size, the size of the carbon block, the particle size of the coke (the packing material) and the packing factor of the same, gas quantity and speed together with the alignment of the carbon blocks in the cassettes. A common feature concerning these parameters is that they should be kept at a constant value over the course of time, such that the difference between the gas temperature and the carbon block temperature may be kept at an approximately constant level.

The ability to controlling a ring section furnace on the basis of the gas temperature depends on the above mentioned conditions. In practice, in case the values of the above mentioned parameters change over the course of time, e. g. as a result of wear in the brickwork, thereby allowing the entrance of false air, this has to be compensated for when following the time/temperature curve. To obtain a good utilization of the energy value (heat value) of the fuel, it is required that all parts of the combustion zone receive a sufficient amount of oxygen, ensuring that the combustion will be complete.

Further, under unfavorable conditions, incomplete combustion results in the formation of gases that may cause an explosion in the furnace. Thus, the oxygen content in the gas at various locations in the calcinating process, is of great importance with respect to the quality of the process.

A balanced process control serves to avoid thermal shocks, i. e. rapid changes of temperature in the carbon blocks and in the refractory construction of the furnace, which could lead to crack formation and deformation and, consequently, an increase in the amount of wrecked carbon blocks and extended maintenance work on the refractory constructions.

3

A substantial weakness in the existing ring section furnaces is that they are constructed as a continues brickwork of refractory bricks and mortar that forms chambers, walls and channels. Constructions of this type will, over the course of time, become degraded due to the thermal stresses present as the construction is repeatedly heated and cooled. This degradation comprises cracks and displacements that results in the unwanted passage of air and gases.

As mentioned initially, flue gases formed in the combustion zone are sucked out of the first chamber (K2) in the preheating zone through a pipe connection to a common ring duct. As a result, the uncovered cold chamber (K1) adjacent the chamber (K2) where the exhaust fan is placed, is exposed to low pressure in an A-part of the chamber leading to the entrance of false air from the part to the preheating zone. Following this, the capability of the exhaust fan to suck air in the opposite direction, i. e. from the cooling zone, through the combustion zone and to the preheating zone, is substantially reduced.

SUMMARY OF THE INVENTION

It is been an object of the present invention to provide a device that substantially eliminates the entrance of false air in the preheating zone (K2), and thereby gaining an increase in the efficiency of the ring section furnace together with a reduction in the amount of gases exhausted from the furnace.

According to the invention, this is achieved by a device characterized in that the entrance of false air from the first chamber adjacent the preheating zone is eliminated by the arrangement of a counterpressure fan in connection with the first chamber.

BRIEF DESCRIPTION OF THE DRAWINGS

In the following, a more detailed description of the invention will be made by the use of an example and with reference to the attached drawings, in which.

DETAILED DESCRIPTION OF THE PREFERRED EMBODIMENT

Figure 1:
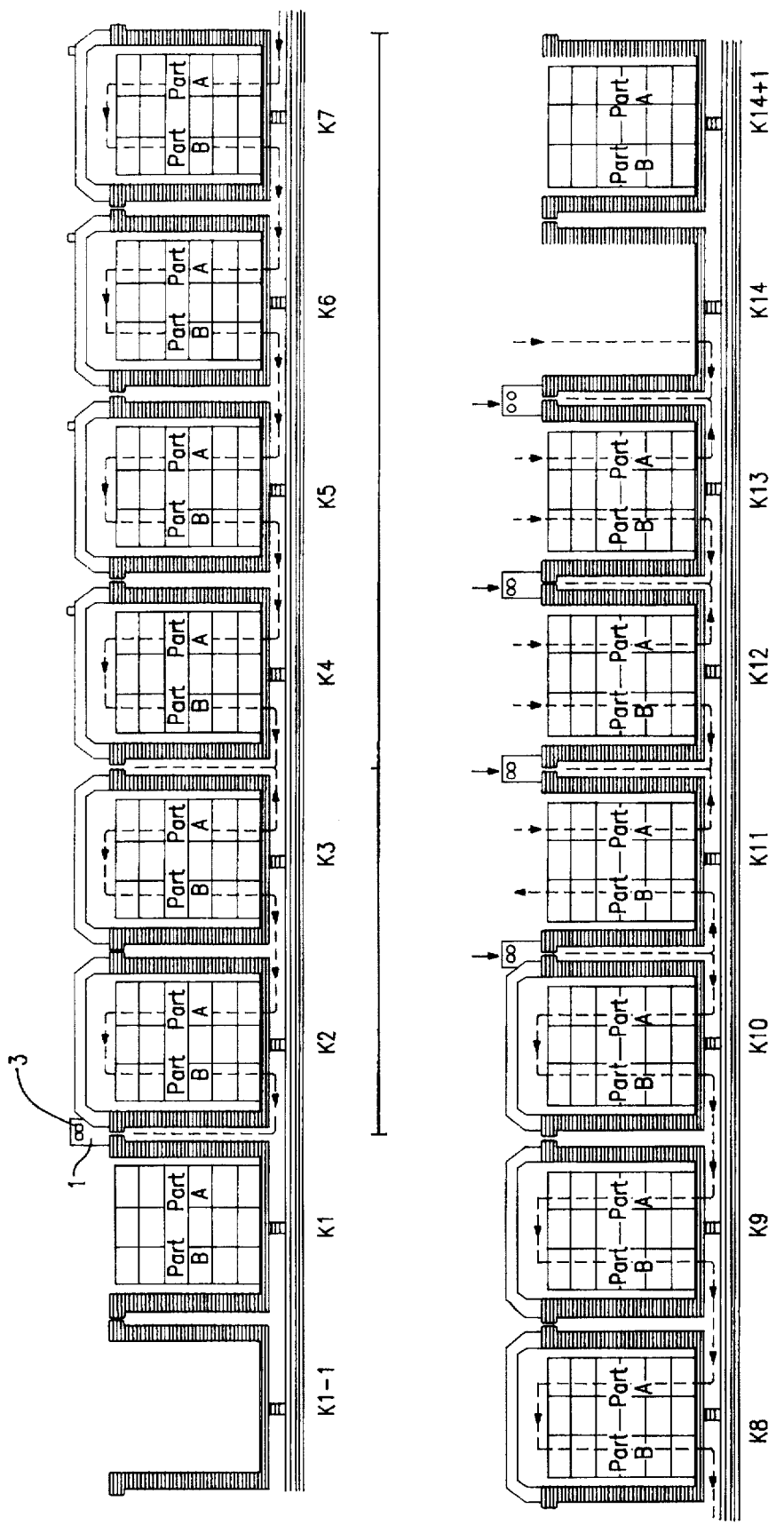
FIG. 1 shows the principles of a ring section furnace with a cooling zone, a combustion zone and a preheating zone.

FIG. 1 shows a principal drawing that describes the course of events in the process. An exhaust fan 3 in a pipe connection 1, or possibly an exhaust fan (not shown) connected to a ring duct (not shown) at a distant location sucks combustion air through a the cooling zone K10-K8 and further through a combustion zone K7-K4 where it is combusted together with fuel. The combustion gases that are formed in a combustion zone are then sucked through the preheating zone K3-K2 and led to a ring duct 10. The exhaust fan 3 is connected to K2, and thus the suction pressure is strongest in this area. Followed by this, the exhaust fan sucks false air from A-part 8 in the chamber K1, and consequently a low pressure is formed in the A-part 8.

Figure 2:
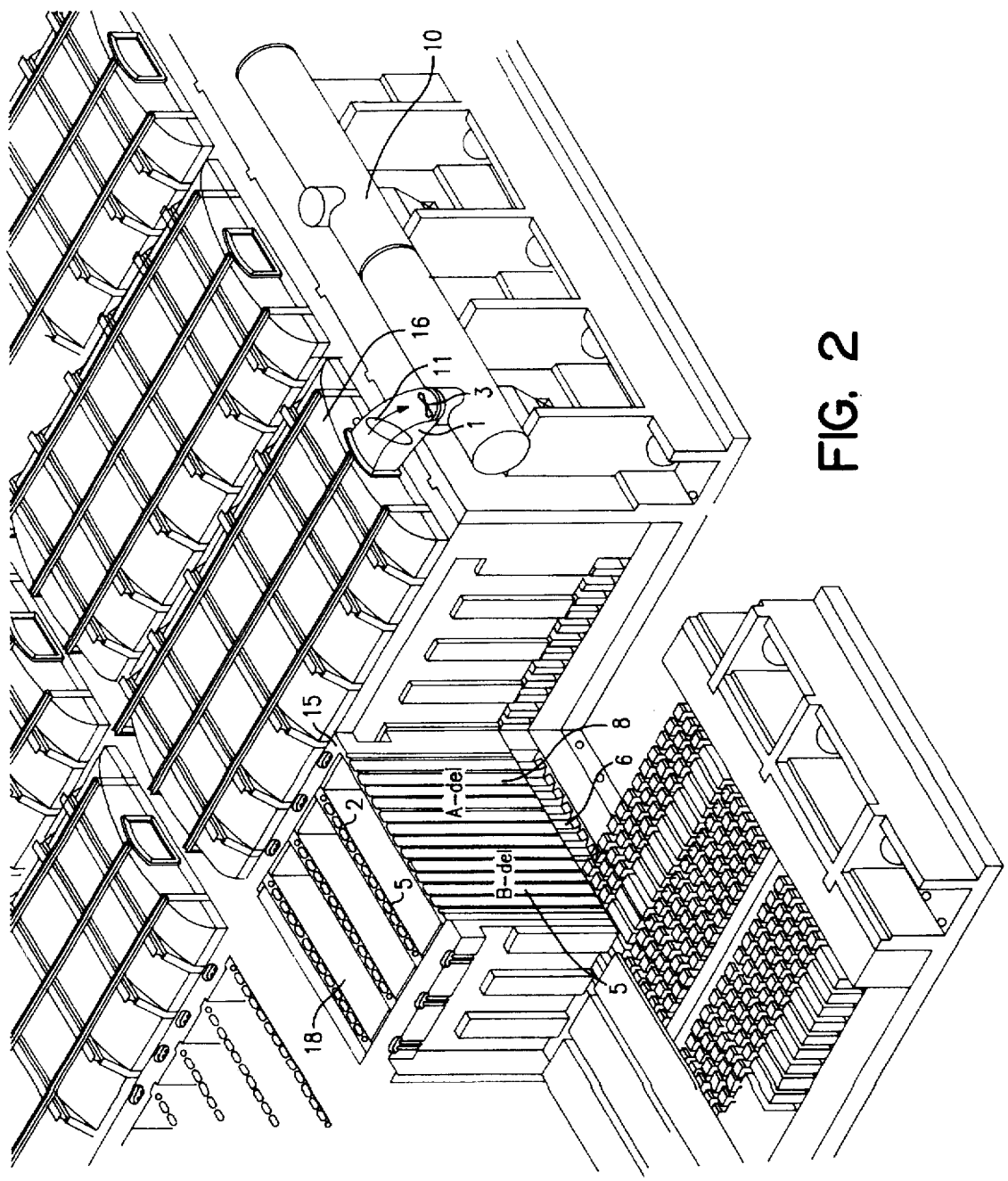
FIG. 2 shows in perspective a ring section furnace on an enlarged scale with a section through a chamber.

FIG. 2 shows a ring section furnace with a section through a chamber having chamber walls 15, cassettes 18, cassette walls 2 and flue gas channels 5. Below the bottom of the cassettes 18 there is arranged a dividing wall 6 that divides the space below the cassettes in to two parts, an A-part 8 and a B-part 7. The flue gases in the flue gas channels are led upwards in the A-part 8 and downwards in the B-part 7 in the chambers K10-K2, and in the opposite direction in chamber K1, where false air is sucked from chamber K1 to chamber K2. In the example shown in FIG. 2, the lid 16 above the chamber is connected to the ring duct 10 through the pipe connection 1, wherein there is arranged a closing device 11 together with the exhaust fan 3.

Figure 3:
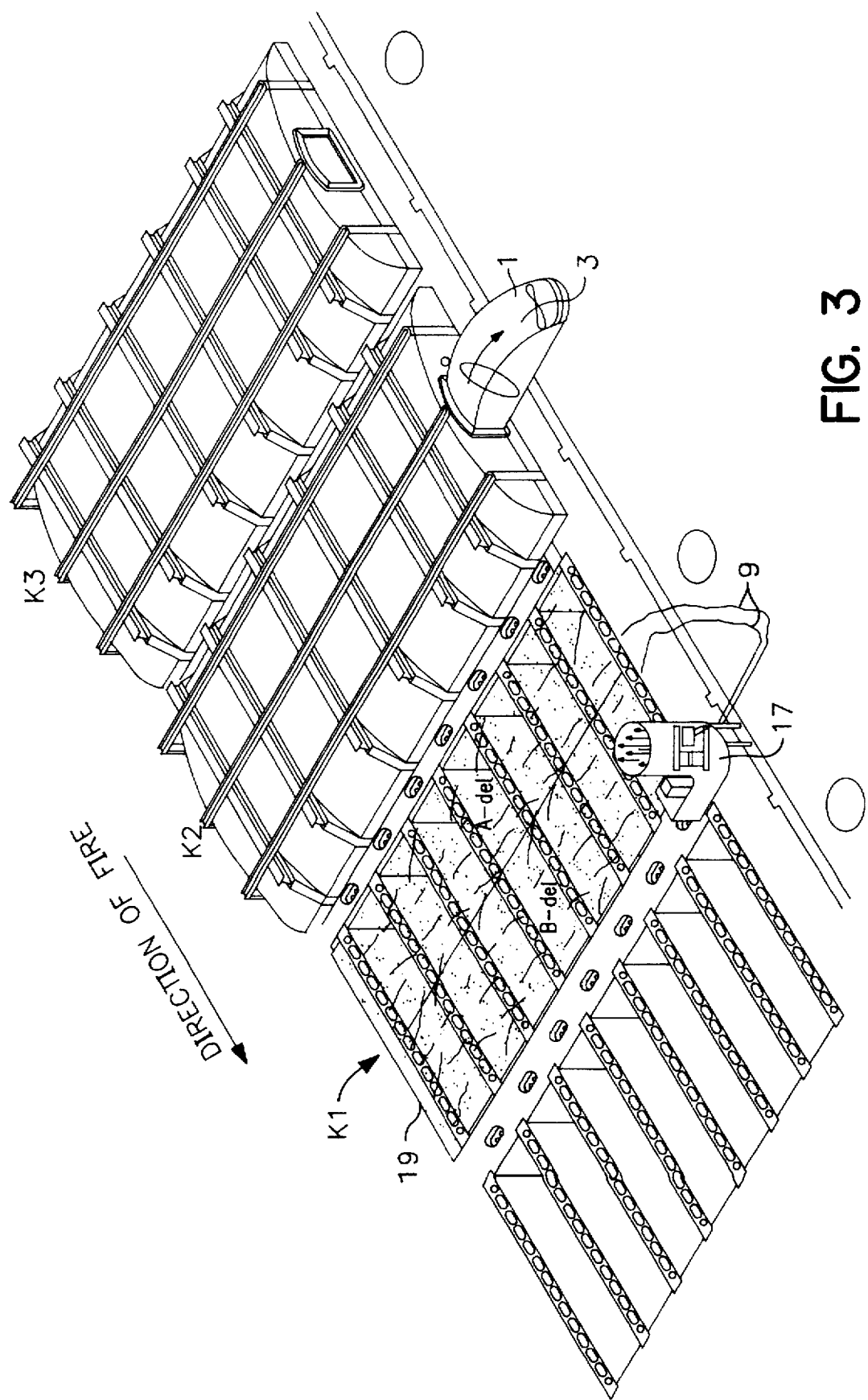
FIG. 3 shows a ring section furnace with a cut through a chamber, and with a counterpressure fan arranged according to the invention.

FIG. 3 shows the exhaust fan 3, together with a counterpressure fan arranged according to the invention, either provided with a pipe connection exhausting the gases above the roof (not shown), or to the ambient environment. In case the exhaust from the counterpressure fan contains gases, these gases may be led through a pipe connection and the ring duct (not shown) to a purifying plant. The counterpressure fan 17 is equipped with a differential pressure sensor (not shown) that is connected to the A and B parts in chamber K1 through lines or hoses 9. The top of the chamber is covered with a sheet of plastic material 19. The counterpressure fan 17 connected to the furnace shaft in the chamber wall adjacent the B-part in chamber K1, is controlled by the pressure difference in the A- and the B parts in chamber K1 by means of a frequency converter (not shown).

The application of the counter pressure fan leads to a substantial elimination of the sucking of false air from chamber K1 to chamber K2 by the exhaust fan 3. This results in that a better control of the combustion process, and thus the temperatures in the furnace, is achieved. Further, with this provision, the total amount of gas sucked through the ring duct 10 is substantially reduced, and thereby the amount of gas to be purified is decreased. Finally, this leads to a reduction in the investment—and the operation costs of the exhaust gas purifying plant.

We claim:

1. A ring section furnace, comprising:
   a plurality of chambers for receiving carbon bodies, said plurality of chambers comprising group of said chambers forming a preheating zone, a combustion zone and a cooling zone in a calcination process;
   a common ring duct having a pipe connection that is connected with a first chamber of said preheating zone of said group of chambers, whereby flue gases formed during the calcination process can be suctioned out from said first chamber through said pipe connection; and
   a suction fan connected with one of said plurality of chambers outside of said group of said plurality of chambers forming said preheating zone, said combustion zone and said cooling zone and having a direction of suction such that said suction fan draws air out of said one of said plurality of chambers when operated, said one of said plurality of chambers being immediately adjacent to said first chamber of said preheating zone.

2. The ring section furnace of claim 1, wherein said suction fan comprises a frequency converter for control thereof.

3. The ring section furnace of claim 2, wherein each one of said plurality of chambers is divided into two parts, an A part and a B part, defining respective gas flow paths, and wherein said one of said plurality of chambers adjacent said first chamber has a differential pressure sensor connected to the A part and the B part thereof, said differential pressure sensor determining a pressure difference between the A part and the B part and being connected with said frequency converter for control of said suction fan based upon the pressure difference.

4. The ring section furnace of claim 1, wherein said one of said plurality of chambers adjacent said first chamber is covered by a plastic sheet.

5. A method of calcination using a ring section furnace, comprising the steps of:

placing carbon bodies to be calcined in a plurality of chambers;

calcining the carbon bodies by forming a preheating zone, a combustion zone and a cooling zone with a group of a minority of the plurality of chambers, wherein preheating of the carbon bodies takes place in the preheating zone, combusting a fuel takes place in the combustion zone and cooling of the carbon bodies takes place in the cooling zone;

suctioning flue gases formed during said step of calcining out from a first of the plurality of chambers that forms a part of the preheating zone through a pipe connection to a common ring duct; and operating a suction fan which is connected with one of the plurality of chambers outside of the group of chambers forming the preheating zone, the combustion zone and the cooling zone, the one of the plurality of chambers being immediately adjacent to the preheating zone and the first of the plurality of chambers, so as to draw air out of the one of the plurality of chambers and provide a suction pressure in the one of the plurality of chambers, and preventing the entry of air from the one of the plurality of chambers into the first of the plurality of chambers.

6. The ring section furnace of claim 5, wherein the suction fan comprises a frequency converter controlling the suction fan during operation thereof.

7. The ring section furnace of claim 6, wherein the plurality of chambers each are divided into two parts, an A part and a B part, defining respective gas flow paths, and wherein the first one of the plurality of chambers has a differential pressure sensor connected to the A part and the B part thereof, the differential pressure sensor determining a pressure difference between the A part and the B part and being connected with and controlling the frequency converter so as to control the counter pressure fan based upon the pressure difference.

8. The ring section furnace of claim 5, wherein the first one of the plurality of chambers is covered by a plastic sheet.

9. A ring section furnace, comprising:

a plurality of chambers for receiving carbon bodies during a calcination process, said plurality of chambers comprising a group of said chambers forming a preheating zone, a combustion zone and a cooling zone in a calcination process;

a common ring duct having a pipe connection that is connected with a first chamber of said preheating zone, whereby flue gases formed during the calcination process can be suctioned out from said first one of said plurality of chambers through said pipe connection; and means for reducing the pressure in one of said plurality of chambers that is outside of said group of said plurality of chambers forming said preheating zone, the said combustion zone and said cooling zone by drawing air out of said one of said plurality of chambers; said one of said plurality of chambers being immediately adjacent said first chamber of said preheating zone such that a flow of air from said one of said plurality of chambers to said first chamber of said preheating zone is substantially eliminated.

\* \* \* \* \*